(12) United States Patent
Deans et al.

(10) Patent No.: US 11,111,364 B2
(45) Date of Patent: Sep. 7, 2021

(54) FLAME RETARDANT POLYMER COMPOSITE MATERIALS AND METHODS OF MAKING THE SAME

(71) Applicant: CASE WESTERN RESERVE UNIVERSITY, Cleveland, OH (US)

(72) Inventors: Taneisha Deans, Cleveland, OH (US); David Schiraldi, Shaker Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 75 days.

(21) Appl. No.: 16/083,880

(22) PCT Filed: Mar. 10, 2017

(86) PCT No.: PCT/US2017/021817
§ 371 (c)(1),
(2) Date: Sep. 10, 2018

(87) PCT Pub. No.: WO2017/156411
PCT Pub. Date: Sep. 14, 2017

(65) Prior Publication Data
US 2019/0077940 A1    Mar. 14, 2019

Related U.S. Application Data

(60) Provisional application No. 62/306,760, filed on Mar. 11, 2016.

(51) Int. Cl.
| | | |
|---|---|---|
| C08L 23/06 | (2006.01) |
| C08K 5/00 | (2006.01) |
| C07G 1/00 | (2011.01) |
| C09K 21/06 | (2006.01) |
| C08L 89/06 | (2006.01) |
| C08L 23/08 | (2006.01) |
| C08K 5/1545 | (2006.01) |
| C08L 23/12 | (2006.01) |
| C08L 25/06 | (2006.01) |
| C08L 55/02 | (2006.01) |
| C08L 97/00 | (2006.01) |
| C08L 51/06 | (2006.01) |
| C08K 3/22 | (2006.01) |
| C08K 3/34 | (2006.01) |
| C08K 5/06 | (2006.01) |
| C08K 5/092 | (2006.01) |
| C08L 27/18 | (2006.01) |
| C08L 83/04 | (2006.01) |

(52) U.S. Cl.
CPC .............. *C08L 23/06* (2013.01); *C07G 1/00* (2013.01); *C08K 5/0066* (2013.01); *C08K 5/1545* (2013.01); *C08L 23/0815* (2013.01); *C08L 23/12* (2013.01); *C08L 25/06* (2013.01); *C08L 55/02* (2013.01); *C08L 89/06* (2013.01); *C08L 97/005* (2013.01); *C09K 21/06* (2013.01); *C08K 3/22* (2013.01); *C08K 3/346* (2013.01); *C08K 5/06* (2013.01); *C08K 5/092* (2013.01); *C08K 2003/2227* (2013.01); *C08L 27/18* (2013.01); *C08L 51/06* (2013.01); *C08L 83/04* (2013.01); *C08L 2201/02* (2013.01); *C08L 2207/066* (2013.01)

(58) Field of Classification Search
CPC ...... C08L 23/06; C08L 23/0185; C08L 23/12; C08L 89/06; C08L 25/06; C08L 55/02; C08L 97/005; C08L 51/06; C08L 27/18; C08L 83/04; C08L 2201/02; C08L 2207/066; C07G 1/00; C09K 21/06; C08K 5/1545; C08K 5/0066; C08K 5/06; C08K 5/092; C08K 3/22; C08K 3/346; C08K 2003/2227
See application file for complete search history.

(56) References Cited

U.S. PATENT DOCUMENTS

| | | | | |
|---|---|---|---|---|
| 6,797,776 B1 * | 9/2004 | Suzuki | .................... | C08L 23/10 525/98 |
| 2006/0214142 A1 | 9/2006 | Nikkeshi | | |
| 2009/0215916 A1 * | 8/2009 | Krohnke | ................ | C08K 5/092 521/123 |

(Continued)

FOREIGN PATENT DOCUMENTS

| | | |
|---|---|---|
| CN | 101781418 A | 7/2010 |
| KR | 20090095889 A | 9/2009 |

OTHER PUBLICATIONS

Tributsch, H., et al.; High Performance Structures and Materials IV, 2008, p. 43-52.*

(Continued)

*Primary Examiner* — Robert S Jones, Jr.
(74) *Attorney, Agent, or Firm* — Renner, Otto, Boisselle & Sklar, LLP

(57) ABSTRACT

A polymer composite material includes a blend of one or more thermoplastic polymers and one or more bio-based flame retardant additives, wherein the one or more bio-based flame retardant additives are present in an amount of 35 to 100 parts per 100 parts by weight of the one or more thermo-plastic polymers. A method of forming the polymer composite material includes: blending the one or more thermoplastic polymers and the one or more bio-based flame retardant additives together at a temperature between 140° C. and 230° C. to form the polymer composite material; forming an article from the polymer composite material; and cooling the formed article.

14 Claims, 4 Drawing Sheets

(56) References Cited

U.S. PATENT DOCUMENTS

2015/0329513 A1* 11/2015 Mitra ................ C07D 307/00
526/271
2017/0313858 A1* 11/2017 Tanaka .................... C08L 1/02

OTHER PUBLICATIONS

Chiellini, E., et al.; Biomacromolecules, 2001, vol. 2, p. 806-811.*
Chuaynukul, K., et al.; Research Journal of Chemical and Environmental Sciences, 2014, vol. 2, p. 1-9.*
Sigma Aldrich, Tannic Acid product data sheet, p. 1, accessed Apr. 21, 2020 [url: https://www.sigmaaldrich.com/catalog/substance/tannicacid170120140155411?lang=en&region=US#].*
International Search Report for related International Application No. PCT/US2017/021817 dated Jun. 8, 2017.
International Preliminary Report on Patentability for related International Application No. PCT/US2017/021817 dated Sep. 11, 2018.

* cited by examiner

FLAME RETARDANT POLYMER COMPOSITE MATERIALS AND METHODS OF MAKING THE SAME

RELATED APPLICATION DATA

This application is a national phase of International Application No. PCT/US2017/021817 filed Mar. 10, 2017 and which claims the benefit of U.S. Provisional Application No. 62/306,760 filed Mar. 11, 2016, the contents of which are hereby incorporated by reference in their entirety.

This invention was made with government support under DMR-0423914 awarded by the National Science Foundation. The government has certain rights in the invention.

TECHNICAL FIELD

The present disclosure relates generally to flame retardant materials, and in particular, to flame retardant polymer composite materials and methods of making the same.

BACKGROUND

Most commercial polymers (e.g., plastics) are inherently flammable, as they are organic. Polymers are mostly composed of carbon, oxygen, and hydrogen; and are therefore subject to combustion in the presence of elevated temperatures. Polymers are also mostly produced by polymerization of monomers derived from (flammable) oil and natural gas fractions.

In order to be safe for use in commerce, many polymers are combined with one or more additives in order to produce a composite material in which the polymer is provided with flame retardant properties. In some conventional examples, the additive is an organic material such as a halogenated organic molecule (e.g., brominated aromatic molecules such as decabromobiphenyl). In other conventional examples, the additive is an inorganic material (e.g., non-flammable materials, such as natural clays, talc, and other minerals; or inorganic compounds that contain waters of hydration and dehydrate upon reaching a critical temperature, releasing their bound waters to cool and potentially stop combustion of the polymer to which they have been added).

However, there are issues with the use of such conventional flame retardant additives. For example, many organic flame retardants (or their combustion by-products) are toxic to humans/animals/ecosystems, thereby raising concerns for their use. As another example, inorganic flame retardant additives are generally required to be present at substantial levels of addition (e.g., 20-50+% addition by weight) in the polymer, which leads to difficulties in processing the polymer and/or a reduction in the mechanical properties of the polymer.

SUMMARY

The present disclosure provides flame retardant polymer composite materials wherein the polymer is modified using one or more tannins and/or gelatins as flame retardant additive(s). The one or more tannins and/or gelatins provide a bio-based additive that has been found by the inventors to provide flame retardant properties to the polymer. Addition of the one or more tannins and/or gelatins to the polymer as a flame retardant additive may address the above-described issues and limitations associated with conventional organic and inorganic flame retardant additives. In some embodiments, the one or more tannins and/or gelatins may be used alone or in combination with one another in order to provide the desired flame retardant properties to the polymer composite material. In other embodiments, the one or more tannins and/or gelatins may be used in combination with one or more conventional organic and/or inorganic flame retardant additives to provide the desired flame retardant properties to the polymer composite material. Use of the one or more tannins and/or gelatins in combination with one or more conventional organic and/or inorganic flame retardant additives may lower the amount of the conventional organic and/or inorganic flame retardant additives used in the polymer material, thereby lowering the toxicity and/or improving the mechanical properties of the flame retarded polymer composite material as compared with a corresponding polymer composite material to which a greater amount of the one or more conventional organic and/or inorganic flame retardant additives has been added.

The present disclosure also provides methods of making the flame retardant polymer composite materials.

In accordance with one aspect of the present disclosure, a polymer composite material includes a blend of one or more thermoplastic polymers and one or more bio-based flame retardant additives, wherein the one or more bio-based flame retardant additives are present in an amount of 35 to 100 parts per 100 parts by weight of the one or more thermoplastic polymers.

In some embodiments, the one or more bio-based flame retardant additives includes tannic acid. The tannic acid may be present from about 40 to about 100 parts per 100 parts by weight of the one or more thermoplastic polymers. The tannic acid may be present from about 45 to about 60 parts per 100 parts by weight of the one or more thermoplastic polymers. In another embodiment, the one or more bio-based flame retardant additives further includes gelatin. The gelatin may include fish gelatin.

In some embodiments, the polymer composite material further includes one or more additional flame retardant additive other than tannic acid. The additional flame retardant additive may include one or more of magnesium hydroxide hydrate and melamine cyanurate.

In some embodiments, a sum of the flame retardant additives is present from about 40 to about 100 parts per 100 parts by weight of the one or more thermoplastic polymers.

In some embodiments, a sum of the flame retardant additives is present from about 40 to about 60 parts per 100 parts by weight of the one or more thermoplastic polymers.

In some embodiments, the one or more bio-based flame retardant additives includes gelatin. The gelatin may include fish gelatin. The gelatin may be present from about 40 to about 100 parts per 100 parts by weight of the one or more thermoplastic polymers. The gelatin may be present from about 40 to about 60 parts per 100 parts by weight of the one or more thermoplastic polymers.

In some embodiments, the one or more thermoplastic polymers includes polyethylene. The one or more thermoplastic polymers may include one or more of low-density polyethylene (LDPE), linear-low-density polyethylene (LLDPE), very-low-density polyethylene (VLDPE), medium-density polyethylene (MDPE), high-density polyethylene (HDPE), ultra-high-molecular-weight polyethylene (UHMWPE), ultra-low-molecular-weight polyethylene (ULMWPE), high-molecular-weight polyethylene (HMWPE), cross-linked polyethylene (PEX), and high-density cross-linked polyethylene (HDXLPE).

In some embodiments, the one or more thermoplastic polymers includes low-density polyethylene (LDPE).

In some embodiments, the one or more thermoplastic polymers includes polypropylene. The one or more thermoplastic polymers may include one or more of syndiotactic polypropylene, atactic polypropylene, and isotactic polypropylene.

In some embodiments, the one or more thermoplastic polymers includes one or more of acrylonitrile butadiene styrene (ABS) copolymer, nylon 6, nylon 6,6, polyamides, poly(butylene terephthalate), poly(ethylene terephthalate) and its copolymers, polyesters, thermoplastic polyurethanes, polyester-ether elastomers, and polyacetal.

In some embodiments, the one or more thermoplastic polymers includes polystyrene.

In some embodiments, the one or more thermoplastic polymers includes expanded polystyrene. The polymer composite material may be a foam material.

In some embodiments, the polymer composite material includes one or more compatibilizers. The one or more compatibilizers may include one or more maleated polymers. The one or more compatibilizers may include one or both of maleated polyethylene and maleated polypropylene. A sum of the one or more compatibilizers may be present from about 0.5 to about 10 parts per 100 parts by weight of the one or more thermoplastic polymers.

In some embodiments, the polymer composite material further includes one or more processing aids. The one or more processing aids may include one or more of citric acid, stearic acid, silicone oil, and dibenzylidene sorbitol. A sum of the one or more processing aids may be present from about 0.5 to about 10 parts per 100 parts by weight of the one or more thermoplastic polymers.

In some embodiments, the polymer composite material further includes one or more anti-drip agents. The one or more anti-drip agents may include one or more of PTFE, alumina, and clay. A sum of the one or more anti-drip agents may be present from about 0.5 to about 10 parts per 100 parts by weight of the one or more thermoplastic polymers.

In accordance with another aspect of the present disclosure, a method of forming a polymer composite material includes: blending the one or more thermoplastic polymers and the one or more bio-based flame retardant additives together at a temperature between 140° C. and 240° C. to form the polymer composite material; forming an article from the polymer composite material; and cooling the formed article.

In some embodiments, one or more of the compatibilizers, processing aids, and anti-drip agents are blended together with the one or more thermoplastic polymers and the one or more bio-based flame retardant additives to form the polymer composite material.

In some embodiments, the temperature at which the one or more thermoplastic polymers and the one or more bio-based flame retardant additives are blended together is between 140° C. and 190° C.

In some embodiments, the temperature at which the one or more thermoplastic polymers and the one or more bio-based flame retardant additives are blended together is between 150° C. and 180° C.

In some embodiments, the temperature at which the one or more thermoplastic polymers and the one or more bio-based flame retardant additives are blended together is between 200° C. and 220° C.

In some embodiments, the blending is performed for 5 minutes or less. The blending may be performed for 3 minutes or less. The blending may be performed for 1 minute to 3 minutes.

In some embodiments, the blending is performed in an extruder.

In some embodiments, the blending is performed in a batch mixer.

In some embodiments, the formed article is pellets or beads. The pellets or beads may be configured for use as a raw material in connection with a subsequent extrusion, injection molding, compression molding, or steam pressing process.

The foregoing and other features are hereinafter described in greater detail with reference to the accompanying drawings.

DETAILED DESCRIPTION

Figure 1:
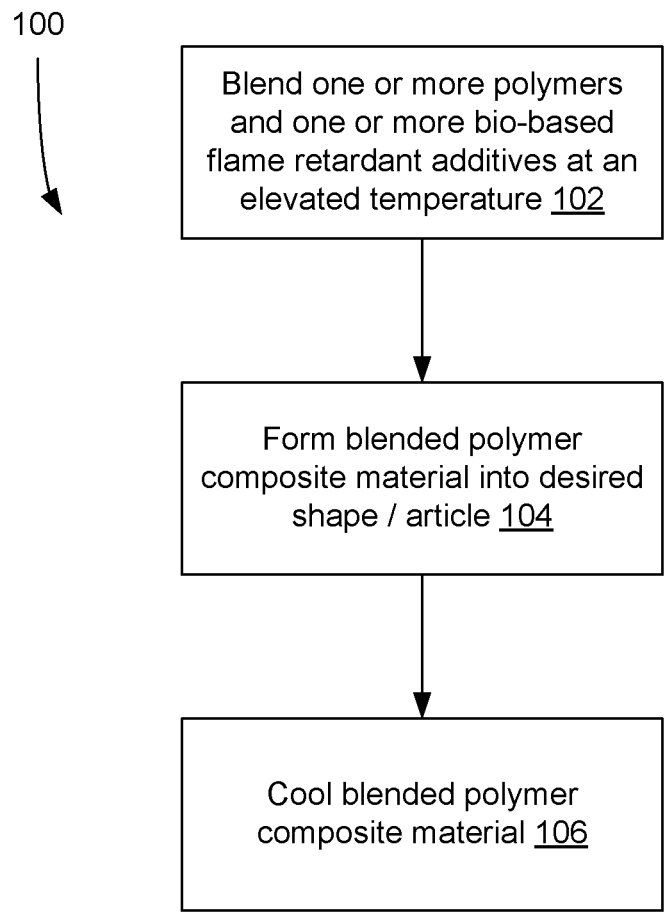
FIG. 1 is a flowchart showing an exemplary method of forming a polymer composite material.

The present disclosure provides flame retardant polymer composite materials in which one or more bio-based flame retardant additives (e.g., tannins and/or gelatins have been added as flame retardant additive(s) to the polymer. The properties of the polymer composite material may be modified by the one or more tannins and/or gelatins. As such, the polymer composite material in which the one or more tannins and/or gelatins have been added may also be referred to herein as a "modified polymer."

The polymer composite materials of the present application may be produced using one or more polymers and one or more tannins and/or gelatins. Embodiments of the polymer composite materials may also include one or more other flame retardant additives and/or one or more other additives.

The polymer composite material may include one or more polymers. In some embodiments, the one or more polymers may include one or more thermoplastic polymers. Such polymers may be modified or unmodified hydrocarbons. Examples include polyethylene such as low-density polyethylene (LDPE), linear-low-density polyethylene (LLDPE), very-low-density polyethylene (VLDPE), medium-density polyethylene (MDPE), high-density polyethylene (HDPE), ultra-high-molecular-weight polyethylene (UHMWPE), ultra-low-molecular-weight polyethylene (ULMWPE), high-molecular-weight polyethylene (HMWPE), cross-linked polyethylene (PEX), and high-density cross-linked polyethylene (HDXLPE); polypropylene such as isotactic polypropylene, syndiotactic polypropylene, and atactic polypropylene; polystyrene such as atactic polystyrene, syndiotactic polystyrene, and isotactic polystyrene; polybutylene such as isotactic polybutylene, syndiotactic polybutylene, and atactic polybutylene; polymethylpentene; polyolefin elastomers (POE); and blends thereof. Other exemplary polymers that may be included in the polymer composite material include acrylonitrile butadiene styrene (ABS) copolymer, nylon 6, nylon 6,6, polyamides, poly(butylene terephthalate), poly(ethylene terephthalate) and its copolymers, polyesters, thermoplastic polyurethanes, polyester-ether elastomers, polyacetal (polyoxymethylene), and blends thereof. In those embodiments in which the one or more polymers include polystyrene, the polystyrene may be in the form of, or the polymer composite material may be subsequently processed to provide the polystyrene in the form of, expanded polystyrene (EPS).

In some examples, the one or more polymers (e.g., the single polymer material or blend of polymers) constitutes at least about 50 wt % of the total weight of the polymer composite material. In some examples, the one or more polymers constitutes at least about 60 wt % of the total weight of the polymer composite material. In other examples, the one or more polymers constitutes at least about 70 wt % of the total weight of the polymer composite material. In other examples, the one or more polymers constitutes at least about 80 wt % of the total weight of the polymer composite material. In other examples, the one or more polymers constitutes at least about 90 wt % of the total weight of the polymer composite material. In still other examples, the one or more polymers constitutes from about 50 wt % to about 75 wt % of the total weight of the polymer composite material. In still other examples, the one or more polymers constitutes from about 75 wt % to about 95 wt % of the total weight of the polymer composite material.

The one or more tannins and/or gelatins, as well as the one or more other flame retardant additives and/or one or more other additives (when included), may form the remainder of the polymer composite material. While the amount of the one or more polymers present in the polymer composite material is described above in terms of wt %, the one or more tannins and/or gelatins, the one or more other flame retardant additives, and the one or more other additives present in the polymer composite material are described as in terms of parts per hundred (pph) by weight of the one or more polymers (single or blend) that form the polymer component of the polymer composite material. Such amount will also be referred to herein as "parts per hundred (pph) of the polymer", and it will be appreciated that the polymer may constitute a single polymer or blend of polymers (e.g., such as those described above).

In some embodiments, the polymer composite material includes one or more tannins. Tannins are a family of natural polyphenol materials, found for example in a number of plants, which contain multiple adjacent, chemically-reactive phenolic hydroxyl groups. In one example, tannins may be found in high concentrations within the bark of trees. The barks of trees including tannins may maximize char yields when exposed to fire, forming graphitic carbon layers during the burning event. Graphitic carbon layers are very poor heat conductors, assisting with the survival of trees during forest fires. In accordance with the present disclosure, it was found that tannin can act as a charring agent for the polymer composite. Char formation can be enhanced and formation of a protective layer against the heat of the flame can result, thereby decreasing polymer volatilization.

In embodiments where the one or more tannins is incorporated into the polymer composite material, the tannin may be present in an amount from about 1 to about 100 parts per 100 parts by weight of the polymer. In other embodiments, the tannin may be present in an amount from about 45 to about 100 parts per 100 parts by weight of the polymer. In other embodiments, the tannin may be present in an amount from about 45 to about 60 parts per 100 parts by weight of the polymer. In other embodiments, the tannin may be present in an amount from about 1 to about 20 parts per 100 parts by weight of the polymer. In other embodiments, the tannin may be present in an amount from about 5 to about 15 parts per 100 parts by weight of the polymer.

The specific amount of tannin included in the polymer composite material may depend on factors such as the polymer(s) utilized in the polymer composite material and/or the amount of any other flame retardant additives present in the polymer composite material. For example, in embodiments where the tannin is the only flame retardant additive present in the polymer composite material, the amount of tannin may be greater (e.g., about 45 to 100 parts per 100 parts by weight of the polymer) than the amount if one or more other flame retardant additives are present in the polymer composite material (e.g., about 1 to 20 parts per 100 parts by weight of the polymer). The use of specific polymers may also result in a change in the requisite amount of tannin included in the polymer composite to impart the desired flame retardant properties to the polymer composite material.

In some embodiments, it may be desired to include as little tannin as possible in the polymer composite material. If too much flame retardant material is utilized, this may result in increased production cost without realizing an added performance benefit, and in some embodiments may also hinder the mechanical properties of the polymer. But if too little flame retardant material is utilized, the polymer composite material may not have the desired flame retardant properties.

In accordance with the examples set forth below, in some embodiments, the tannin included in the polymer composite material is tannic acid (TA), $C_{76}H_{52}O_{46}$. In other embodiments, one or more other tannins may be used in addition or as an alternative to TA. Examples of other tannins include suitable hydrolysable tannins such as gallic acid and ellagic acid; condensed tannins; and phlorotannins.

In some embodiments, the polymer composite material includes one or more gelatins. Gelatin is a translucent material derived from collagen obtained from animal by-products. In some embodiments, the gelatin is derived from fish by-product. In accordance with the examples set forth below, in some embodiments, the gelatin included in the polymer composite material is fish gelatin. In other embodiments, the gelatin may be derived from by-products of animals such as cows, pork, horses, and/or other animals. Gelatin is an irreversibly hydrolyzed form of collagen, wherein the intermolecular and intramolecular bonds that stabilize insoluble collagen are broken.

In embodiments where the one or more gelatins is incorporated into the polymer composite material, the gelatin may be present in an amount from about 1 to about 100 parts per 100 parts by weight of the polymer. In other embodiments, the gelatin may be present in an amount from about 40 to about 60 parts per 100 parts by weight of the polymer. In other embodiments, the gelatin may be present in an amount from about 40 to about 50 parts per 100 parts by weight of the polymer.

In other embodiments, the gelatin may be present in an amount from about 1 to about 20 parts per 100 parts by weight of the polymer. In other embodiments, the gelatin may be present in an amount from about 1 to about 15 parts per 100 parts by weight of the polymer.

The specific amount of gelatin included in the polymer composite material may depend on factors such as the polymer(s) utilized in the polymer composite material and/or the amount of any other flame retardant additives present in the polymer composite material. For example, in embodiments where the gelatin is the only flame retardant additive present in the polymer composite material, the amount of gelatin may be greater (e.g., about 40 to 60 parts per 100 parts by weight of the polymer) than the amount if one or more other flame retardant additives are present in the polymer composite material (e.g., about 1 to 20 parts per 100 parts by weight of the polymer). The use of specific polymers may also result in a change in the requisite amount of gelatin included in the polymer composite to impart the desired flame retardant properties to the polymer composite material.

In some embodiments, it may be desired to include as little gelatin as possible in the polymer composite material. If too much flame retardant material is utilized, this may result in increased production cost without realizing an added performance benefit, and in some embodiments may also hinder the mechanical properties of the polymer. But if too little flame retardant material is utilized, the polymer composite material may not have the desired flame retardant properties.

In some embodiments, the polymer composite material includes one or more tannins as the only flame retardant additive in the polymer composite material. In other embodiments, the polymer composite material includes one or more gelatins as the only flame retardant additive in the polymer composite material. In other embodiments, the polymer composite material includes one or more tannins and one or more gelatins as the only flame retardant additives in the polymer composite material. The one or more tannins and/or the one or more gelatins may provide the desired flame retardant properties of the polymer composite material.

In other embodiments, the polymer composite material includes one or more tannins and/or the one or more gelatins, in combination with one or more additional flame retardant additives.

Examples of additional flame retardant additives include organic materials such as halogenated organic molecules (e.g., brominated aromatic molecules) and phosphorous flame retardants. Some exemplary compounds include decabromodiphenyl ether, 1,2-ethylene bis(tetrabromophthalimide), tetrabromobisphenol A, hexabromocyclododecane, bis(2,3-dibromopropylether) of tetrabromobisphenol A, and tris(tribromoneopentyl)phosphate. Other exemplary compounds include bisphenol A diphosphate, phosphinate salts, triphenylphosphate, 9,10-dihydro-9-oxa-10-phosphaphenanthrene-10-oxide (DOPO), resorcinol diphosphate, and ammonium polyphosphate.

Other examples of additional flame retardant additives include inorganic materials. In some embodiments, the inorganic materials include non-flammable materials, such as natural clays, talc, and other minerals. In other embodiments, the inorganic materials include inorganic compounds that contain waters of hydration and dehydrate upon reaching a critical temperature, releasing their bound waters to cool and potentially stop combustion of the polymer to which they have been added. Exemplary additional flame retardant additives include magnesium hydroxide, aluminum hydroxide, and melamine cyanurate.

Because the one or more additional flame retardant additives may be used in combination with the one or more tannins and/or the one or more gelatins, the amount of the one or more additional flame retardant additives present in the polymer composite material may be lower than conventional amounts. The amount at which the one or more additional flame retardant additives may be present may be low enough that the additional flame retardant additives by itself would not be enough to provide a satisfactory flame retardant effect; but the sum of the additional flame retardant additive(s) and the one or more tannins and/or the one or more gelatins may provide the desired flame retardant characteristic.

In embodiments where the one or more additional flame retardant additives is incorporated into the polymer composite material in combination with the one or more tannins and/or the one or more gelatins, the one or more additional flame retardant additives may be present in an amount from about 1 to about 60 parts per 100 parts by weight of the polymer composite material. In other embodiments, the one or more additional flame retardant additives may be present in an amount from about 1 to about 50 parts per 100 parts by weight of the polymer composite material. In other embodiments, the one or more additional flame retardant additives may be present in an amount from about 1 to about 40 parts per 100 parts by weight of the polymer composite material. In other embodiments, the one or more additional flame retardant additives may be present in an amount from about 1 to about 30 parts per 100 parts by weight of the polymer composite material. In other embodiments, the one or more additional flame retardant additives may be present in an amount less than 20 parts per 100 parts by weight of the polymer composite material.

In such embodiments, the one or more tannins and/or one or more gelatins may be present in an amount that allows for the reduction of the amount of the additional flame retardant additives, while also providing a desired flame retardant property. In some embodiments where the one or more additional flame retardant additives are incorporated into the polymer composite material in combination with the one or more tannins and/or the one or more gelatins, the one or more tannins and/or the one or more gelatins may be present in an amount similar to that described above in those embodiments where the one or more additional flame retardant additives is not present. In other embodiments where the one or more additional flame retardant additives are incorporated into the polymer composite material in combination with the one or more tannins and/or the one or more gelatins, the one or more tannins and/or the one or more gelatins may be present in an amount less than that described above in those embodiments where the one or more additional flame retardant additives is not present. For example, the one or more tannins and/or one or more gelatins may each be present in amount from about 1 to about 20 parts per 100 parts by weight of the polymer. In other embodiments, the one or more tannins and/or one or more gelatins may be present in an amount from about 1 to about 15 parts per 100 parts by weight of the polymer. In other embodiments, the one or more tannins and/or one or more gelatins may be present in an amount from about 1 to about 10 parts per 100 parts by weight of the polymer.

The polymer composite material may include one or more other additives. Such additives may be used to modify one or more properties other than the flammability of the polymer. For example, additives such as processing aids/antioxidants; anti-drip agents; colorants such as dyes and pigments; antistatic agents; compatibilizing agents such as bonding/coupling agents; crosslinking agents; electrically conductive-fillers including forms of conductive carbon and metal flakes/particles; and any other suitable additives may be incorporated into the polymer composite material. These other additives may each be added in an amount suitable to provide the polymer composite material with a desired appearance, processing attribute, and/or physical property.

In some embodiments, the polymer composite material includes one or more compatibilizers. The one or more compatibilizers may act as a bonding/chelating agent among the components of the polymer composite material. Exemplary compatibilizers include maleated polymers, such as maleated polyethylene and/or maleated polypropylene. In some examples, the one or more compatibilizers are present in the polymer composite material in an amount from about 1 part to about 20 parts per 100 parts by weight of the polymer. In other examples, the one or more compatibilizers are present in the polymer composite material in an amount from about 1 part to about 10 parts per 100 parts by weight of the polymer. In other examples, the one or more compatibilizers are present in the polymer composite material in an amount from about 1 part to about 5 parts per 100 parts by weight of the polymer.

In some embodiments, the polymer composite material includes one or more processing aids and/or antioxidants. The one or more processing aids and/or antioxidants may aid in the manufacture of the material itself by imparting a physical property that may allow the material to be workable during the production process. The antioxidants may also aid in preserving the bio-based flame retardant materials (e.g., during the production process). Exemplary processing aids and/or antioxidants include citric acid, stearic acid, silicone oil, and/or dibenzylidene sorbitol. In some examples, the one or more processing aids and/or antioxidants are present in the polymer composite material in an amount from about 1 part to about 40 parts per 100 parts by weight of the polymer. In other examples, the one or more processing aids and/or antioxidants are present in the polymer composite material in an amount from about 1 part to about 30 parts per 100 parts by weight of the polymer. In other examples, the one or more processing aids and/or antioxidants are present in the polymer composite material in an amount from about 1 part to about 20 parts per 100 parts by weight of the polymer. In other examples, the one or more processing aids and/or antioxidants are present in the polymer composite material in an amount from about 1 part to about 10 parts per 100 parts by weight of the polymer.

In some embodiments, the polymer composite material includes one or more anti-drip agents. Exemplary anti-drip agents include polytetrafluoroethylene (PTFE), alumina (e.g., boehmite alumina), and/or day. In some examples, the one or more anti-drip agents are present in the polymer composite material in an amount from about 1 part to about 20 parts per 100 parts by weight of the polymer. In other examples, the one or more anti-drip agents are present in the polymer composite material in an amount from about 1 part to about 15 parts per 100 parts by weight of the polymer. In other examples, the one or more anti-drip agents are present in the polymer composite material in an amount from about 1 part to about 10 parts per 100 parts by weight of the polymer. In other examples, the one or more anti-drip agents are present in the polymer composite material in an amount from about 1 part to about 5 parts per 100 parts by weight of the polymer.

FIG. 1 shows an exemplary method 100 of forming the polymer composite material. At step 102, the polymer composite material of the present disclosure may be formed by blending the one or more polymers and the one or more bio-based flame retardant additives (together with any additional flame retardant additives and/or other agents) at an elevated temperature. The components of the polymer composite may be blended using a mixing device, such as a batch mixer or twin-screw extruder, depending on the particular manufacturing process (e.g., extrusion, injection molding, compression molding, and calendaring, and the like).

The blending process may be performed at a temperature suitable for effectively dispersing the one or more bio-based flame retardant additives in the one or more polymers, while also avoiding degradation of the one or more bio-based flame retardant additives. This temperature may range, for example, between 120° C. and 400° C. In other embodiments, this temperature may range between 120° C. and 300° C. In other embodiments, this temperature may range between 120° C. and 250° C.

As an example, when the one or more polymers includes LDPE and the one or more bio-based flame retardant additives is tannic acid, the temperature at which the one or more polymers and the one or more bio-based flame retardant additives are blended together may be between 190° C. and 240° C. In other embodiments where the one or more polymers includes LDPE and the one or more bio-based flame retardant additives is tannic acid, the temperature at which the one or more polymers and the one or more bio-based flame retardant additives are blended together may be between 200° C. and 230° C. In other embodiments where the one or more polymers includes LDPE and the one or more bio-based flame retardant additives is tannic acid, the temperature at which the one or more polymers and the one or more bio-based flame retardant additives are blended together may be between 210° C. and 220° C.

As another example, when the one or more polymers includes LDPE and the one or more bio-based flame retardant additives is fish gelatin, the temperature at which the one or more polymers and the one or more bio-based flame retardant additives are blended together may be between 130° C. and 160° C. In other embodiments where the one or more polymers includes LDPE and the one or more bio-based flame retardant additives is fish gelatin, the temperature at which the one or more polymers and the one or more bio-based flame retardant additives are blended together may be between 135° C. and 155° C. In other embodiments where the one or more polymers includes LDPE and the one or more bio-based flame retardant additives is fish gelatin, the temperature at which the one or more polymers and the one or more bio-based flame retardant additives are blended together may be between 145° C. and 155° C.

As another example, when the one or more polymers includes LDPE and the one or more bio-based flame retardant additives is a combination of tannic acid and fish gelatin, the temperature at which the one or more polymers and the one or more bio-based flame retardant additives are blended together may be between 160° C. and 200° C. In other embodiments where the one or more polymers includes LDPE and the one or more bio-based flame retardant additives includes a combination of tannic acid and fish gelatin, the temperature at which the one or more polymers and the one or more bio-based flame retardant additives are blended together may be between 170° C. and 190° C. In other embodiments where the one or more polymers includes LDPE and the one or more bio-based flame retardant additives includes a combination of tannic acid and fish gelatin, the temperature at which the one or more polymers and the one or more bio-based flame retardant additives are blended together may be between 175° C. and 185° C.

Examples set forth above include LDPE, but other polymers or polymer blends may result in a change in the temperature at which the blending process is performed.

The blending process may be performed for any suitable amount of time. As an example, the components may be mixed until a homogeneous polymer composite material is obtained. In some embodiments, blending for extended periods of time may start to diminish the flame resistant properties of the formed polymer composite material. Therefore, in some embodiments, the blending process may be limited to a particular time. In some examples, the blending is performed for 5 minutes or less. In other examples, the blending is performed for 3 minutes or less. In other examples, the blending process is performed for a time period between 1 minute and 3 minutes. A set blending time may help to replicate the formed polymer composite material and its resultant flame resistant properties.

Subsequent to blending, at step 104, an article may be formed from the blended polymer composite material. Formation may be performed using a suitable production process, such as extrusion, injection molding, compression molding, or calendaring. Once the article is formed, it may be cooled (step 106). Cooling may be performed passively (e.g., by allowing the material to lower to room temperature) or may be performed actively (e.g., using refrigeration). Optionally, the article formed of the blended polymer composite material may be subjected to any post processing that may be applicable (e.g., cutting, shaping, pressing, etc.).

In some embodiments, the article formed by the production process is a polymer composite material in the form of a pellet(s)/bead(s) or other suitable form that may be subsequently used as a raw material in another production process. For example, the components that collectively form the polymer composite material may be heated and mixed, extruded, and cooled. The cooled product may be cut to a desired size/shape in order to produce pellets/beads that may subsequently be used as a raw material in, e.g., an injection molding process.

In other embodiments, the article may be any other suitable shape. Exemplary articles include components associated with electrical connectors, appliances, batteries, cables, and the like.

As described above, in some embodiments in which the one or more polymers include polystyrene, the polystyrene may be subsequently processed to provide the polystyrene in the form of expanded polystyrene (EPS). For example, the blended polymer composite material including polystyrene may be in the form of pellets/beads (e.g., in some embodiments having an average size of 0.1 mm to 5 mm). These pellets/beads may be expanded through a heating process, for example, with steam or hot air. As an example, the heating process may be conducted at a temperature ranging from 120° C. to 300° C. Although in other embodiments, any suitable temperature to effect expansion of the beads may be used. An agitator may be used during heating to keep the pellets/beads from fusing together. These expanded pellets/beads may be used in the manufacture of an article (e.g., boards or other shapes for insulation, or other suitable products). As an example, an extruding process may be conducted wherein the expanded pellets/beads may be heated (e.g., melted), combined with a blowing agent (optional), and extruded into a desired shape under conditions of high temperature and pressure that are conventional in the art. In another example, the pellets/beads may be steam fused or pressure molded together under conditions of high temperature and pressure that are conventional in the art in a mold having a desired shape. The polymer composite material including the expanded polystyrene may be in the form of a foam (e.g., a foam material formed into a desired shape).

The inventors of the present application have found that the one or more tannins and/or gelatins added to the polymer may yield a composite polymer material having flame retardant properties as compared with a corresponding polymer to which no flame retardant additives have been added. The one or more tannins and/or gelatins provide a bio-based additive. As such, the polymer composite material may be less toxic as compared with polymer composite materials modified by conventional flame retardant materials. The polymer composite material formed using the one or more tannins and/or gelatins may be more biodegradable as compared to a comparative polymer composite material that uses conventional organic and/or inorganic flame retardant additives.

As an example, inclusion of the one or more tannins and/or gelatins can effectively flame retard polyethylene (e.g., low density polyethylene, LDPE), perhaps the most flammable of all commercial plastics. Polyethylene has the same inherent structure as gasoline, just with longer chains/higher molecular weights, and is derived from simply polymerizing ethylene, a major natural gas product.

In some embodiments, the one or more tannins and/or gelatins may be used alone or in combination with one another in order to provide the desired flame retardant properties to the polymer composite material. In other embodiments, the one or more tannins and/or gelatins may be used in combination with one or more conventional organic and/or inorganic flame retardant additives. Use of the one or more tannins and/or gelatins in combination with one or more conventional organic and/or inorganic flame retardant additives may lower the amount of the conventional organic and/or inorganic flame retardant additives used in the polymer material, as less of the conventional organic and/or inorganic flame retardant additives may be required to obtain a desired flame retardant performance. This may lower the toxicity and/or improve the mechanical properties of the flame retarded polymer composite material as compared with a corresponding polymer composite material to which a greater amount of the one or more conventional organic and/or inorganic flame retardant additives has been added.

The flame retardant properties of the polymer composite material including one or more tannins and/or gelatins are shown by subjecting samples of such material to the Underwriters Laboratories 94 (UL(94)) vertical burn test. The UL(94) vertical burn test is one of the most common, and perhaps the most applicable test for a wide range of plastics applications. The UL(94) vertical burn test classifies plastics according to how they burn in various orientations and thicknesses: From lowest (least flame-retardant) to highest (most flame-retardant), using a classification system of V(0), V(1), V(2) or HB.

The UL(94) vertical test is conducted using a specimen (test piece) having a length of 5 inches (125 mm), width of 0.5 inches (13 mm), and a thickness. The thickness of the specimen maybe, for example, 1/16 inch (1.5 mm), 1/32 inch (0.7 mm), or 1/8 inch (3.0 mm). Each specimen is mounted with its length oriented in a vertical direction and about 100 mm above a Bunsen burner tube. A layer of dry absorbent surgical cotton placed about 300 mm below the specimen. A blue 20 mm high flame is applied to the center of the lower edge of the specimen for 10 seconds and removed. If burning ceases within 30 seconds, the flame is reapplied for an additional 10 seconds. If the specimen drips, particles are allowed to fall onto the cotton.

Upon carrying out the UL(94) test, a score of V(0), V(1), V(2) or HB is determined. The V(0) score is most desirable, and in many applications is the only score that is acceptable in that use. The V(0) score indicates that under the testing conditions, the specimen self-extinguishes (stops burning)

within 10 seconds when the ignition source is removed, and that flaming materials do not drip off of the sample during the test (capable of igniting cotton). The V(1) score indicates that under the testing conditions, the specimen self-extinguishes within 30 seconds when the ignition source is removed, and that flaming materials do not drip off of the sample during the test. The V(2) score indicates that under the testing conditions, the specimen self-extinguishes within 30 seconds when the ignition source is removed, and that flaming materials may drip off of the sample during the test. The HB score indicates that under the testing conditions, the specimen does not self-extinguish and may drip flaming material onto the cotton during the test.

In accordance with the present disclosure, embodiments of the polymer composite materials including even LDPE in combination with the one or more tannins and/or gelatins have been found to earn a V(0) rating, with no dripping of flaming materials observed. This is compared with the control material of LDPE containing no flame retardant material, which has a rating of HB.

Embodiments of polymer composite material are illustrated in the following examples. These examples are provided for illustrative purposes and are not considered limitations on the scope of materials and methods utilized in the polymer composite material of the present disclosure. As shown below in the examples, the test samples produced in accordance with the present disclosure have been found to possess a V(0) rating.

EXAMPLES

Polymer composite materials were prepared by combining and mixing the components set forth in the Examples. Each example was mixed using a bench scale mixer at the specified temperature until homogeneously mixed (2.5 minutes or less) and subsequently injection molded or compression molded into the form of a test piece suitable for use in conducting the UL(94) test. In the examples set forth below, the polymer used in the composite is LDPE. The specific LDPE polymer was produced by ExxonMobile Chemical Company, and had a melt flow index (MFI) of 5. It will be understood that other embodiments may include different polymers or polymer blends.

A control sample was prepared by heating LDPE to 200° C. and injection molding the heated material into the shape of a bar having a length of 5 inches (125 mm), a width of 0.5 inches (13 mm), and a thickness of ⅛ inch (3.0 mm). As subjected to the UL(94) test, the control sample ignited and flames were observed burning upwards on the molded bar. Combustion continued until virtually all of the material had been consumed. Flaming polymer dripped downward from the bar, readily igniting cotton located below the test sample. Based on the test result, the control sample was given a HB rating.

Figure 2:
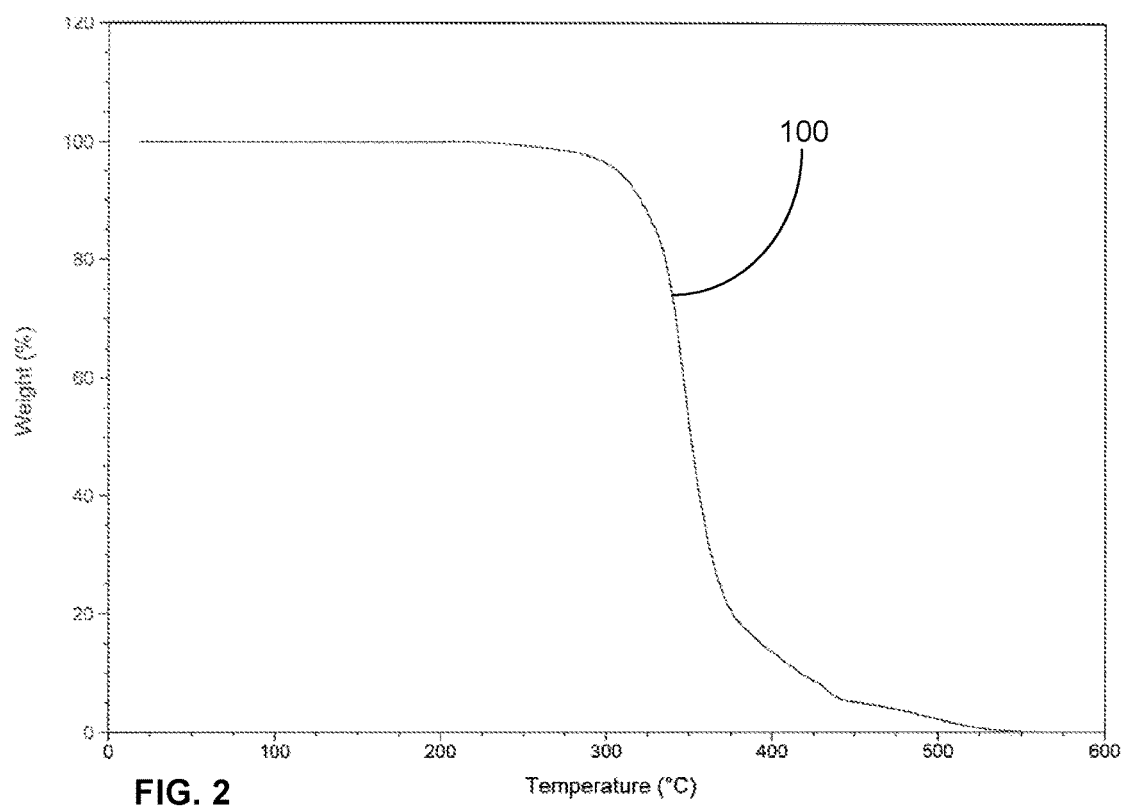
FIG. 2 is a graph showing the temperature of decomposition for low-density polyethylene (LDPE).

FIG. 2 is a graph showing the temperature of decomposition for the control sample. As shown by the curve 100, the initial decomposition temperature is at about 300° C. The rate of decomposition is relatively steep, and the final residue is reached at around 500° C.

Several samples were also prepared in which the LDPE polymer was modified by including a tannin in the polymer composite material. Table 1 sets forth the compositions and results of these samples:

TABLE 1

Polymer Composite Samples including Tannin

| Component | 1 | 2 | 3 | 4 | 5 | 6 | 7 | 8 | 9 | 10 | 11 |
|---|---|---|---|---|---|---|---|---|---|---|---|
| LDPE (pph) | 100 | 100 | 100 | 100 | 100 | 100 | 100 | 100 | 100 | 100 | 100 |
| Tannic Acid (pph) | 40 | 35 | 36 | 22.8 | 25 | 50 | 45 | 7 | 7 | 7 | 25 |
| Citric Acid (pph) | 20 | 3 | 18 | 11.6 | 12.5 | 25 | 22.5 | 3.5 | 3.5 | 3.5 | 12.5 |
| Maleated Polyethylene (pph) | 5 | 5 | 5 | 5 | 4 | 5 | 5 | 5 | 5 | 5 | 5 |
| Stearic Acid (pph) | 4 | | 4 | 4 | 4 | 4 | 4 | 4 | 4 | 4 | 4 |
| PTFE (pph) | 4 | | 4 | 4 | 4 | 4 | 4 | 4 | 4 | 4 | 4 |
| Silicone oil (pph) | 0.5 | | 0.5 | 0.5 | 0.5 | 0.5 | 0.5 | 0.5 | 0.5 | 0.5 | 0.5 |
| Borax (pph) | | | 12 | 13.2 | 25 | | 15 | | | | |
| Magnesium Hydroxide (pph) | | | | | | | | | | 42 | |
| Melamine Cyanurate (pph) | | | | | | | | 42 | 42 | | 25 |
| Boehmite Alumina (pph) | | | | | | | | | 2 | | |
| Mixing Temp. (° C.) | 220 | 200 | 220 | 180 | 200 | 220 | 220 | 180 | 180 | 180 | 180 |
| Molding Method (I = Injection Mold) (C = Compression Mold) | I | C | C | C | C | C | C | C | C | C | C |
| UL(94) Rating | HB | HB | HB | HB | HB | V(0) | V(0) | V(0) | V(0) | V(0) | V(0) |

As shown in Table 1, Samples 1-5 include tannic acid in the polymer composite material as the only flame retardant additive, but at lower amounts (i.e., less than 40 pph). When Samples 1-5 were subjected to the UL(94) test, the sample ignited and flames were observed burning upwards on the molded bar. Samples 1-5 were classified as having a HB rating. Samples 6 and 7 also include tannic acid in the polymer composite material as the only flame retardant additive, but at the greater amounts of 50 and 45, respectively. When Samples 6 and 7 were subjected to the UL(94) test, the sample self-extinguished within 10 seconds from when the Bunsen burner was removed, and flaming materials did not drip off of the sample during the test (and as a result the cotton located below the sample was not ignited). Samples 6 and 7 were classified as having a V(0) rating. While Samples 8-11 include tannic acid in the polymer composite material at lower amounts (7 pph and 25 pph, respectively), Samples 8-11 each also include additional flame retardant additives. When Samples 8-11 were subjected to the UL(94) test, the sample self-extinguished within 10 seconds from when the Bunsen burner was removed, and flaming materials did not drip off of the sample during the test (and as a result the cotton located below the sample was not ignited). Samples 8-11 were classified as having a V(0) rating. In Samples 8-11, the amount of these additional flame retardant additives is reduced as compared with the amount of these additives that would be present if the tannic acid was not present. Hence, the combination of the tannic acid with the additional flame retardant additive allows for the additional flame retardant to be reduced in amount while also providing the above-described flame retardant properties.

Figure 3:
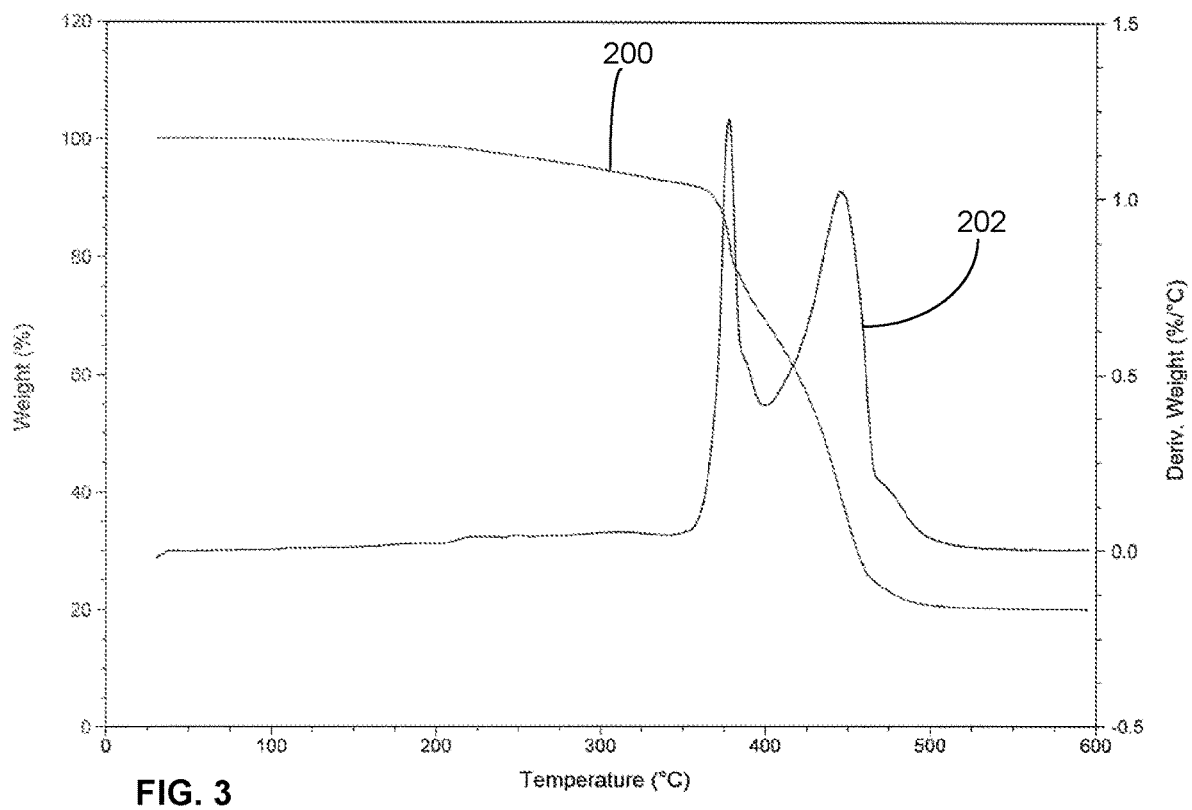
FIG. 3 is a graph showing the temperature of decomposition for a polymer composite material including LDPE and tannic acid.
Figure 4:
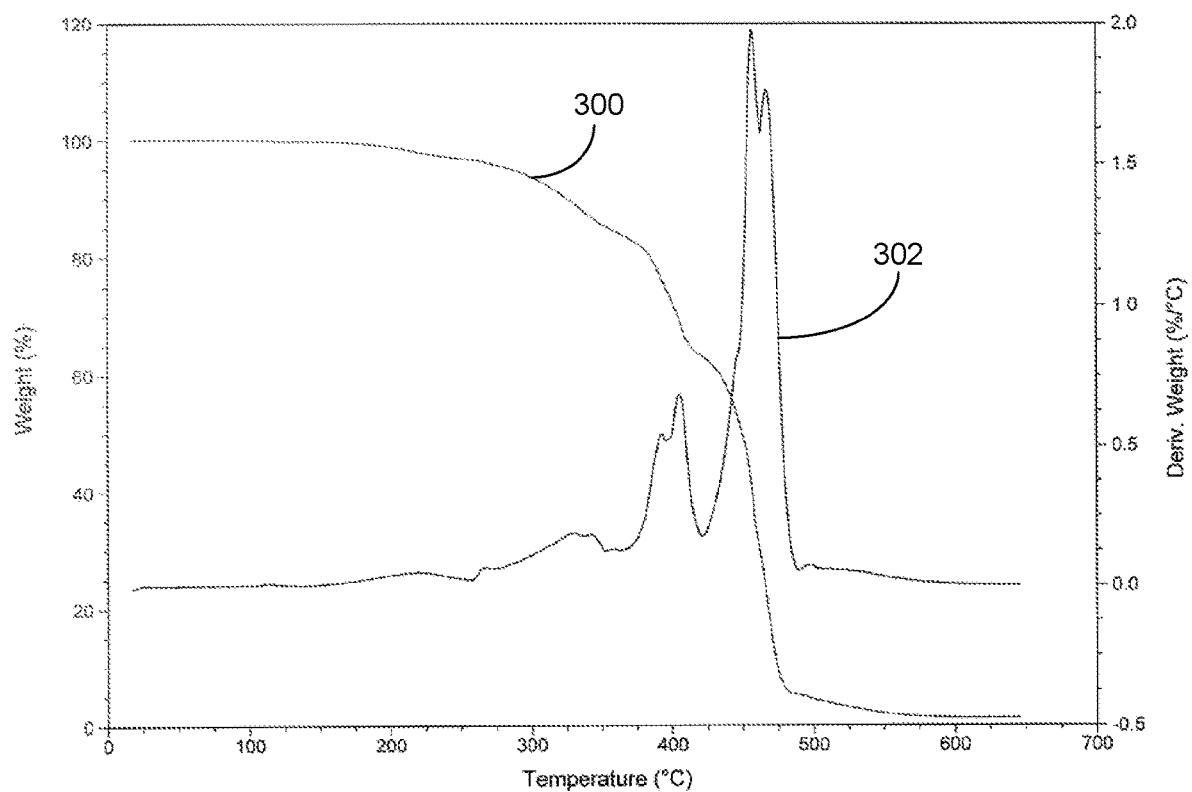
FIG. 4 is a graph showing the temperature of decomposition for a polymer composite material including LDPE, tannic acid, and melamine cyanurate.

FIGS. 3 and 4 are graphs showing the temperature of decomposition for the Samples 6 and 9, respectively. The results shown in FIGS. 3 and 4 illustrate the improvement in the flame retardant property as compared with the LDPE control. Curves 200 and 300 each respectively show the change in weight of the polymer composite material as a function of increased temperature. Curves 202 and 302 each respectively show the rate of change in the weight of the polymer composite material as a function of increased temperature. In FIG. 3 (LDPE and tannin), the initial decomposition temperature is about 375° C., which is higher than that shown in FIG. 2. Similarly, in FIG. 4 (LDPE, tannin, and melamine cyanurate), the initial decomposition temperature is about 380° C.

Samples 1-11 show that when tannic acid makes up the majority of the thermal retardant additive, the components that form the polymer composite material may be processed around 220° C. to achieve an improved flame retardant property. Temperatures outside this range were shown to catch fire and drip molten char. Samples 8-11 further show that when tannic acid makes up the minority of the thermal retardant additive, the components that form the polymer composite material may be processed around 180° C. to achieve an improved flame retardant property. Failure to do so may result in diminished flame retardant properties.

Several samples were also prepared in which the LDPE polymer was modified by including a gelatin in the polymer composite material. Table 2 sets forth the compositions and results of these samples:

TABLE 2

Polymer Composite Samples including Gelatin

| Component | 21 | 22 | 23 | 24 | 25 | 26 |
|---|---|---|---|---|---|---|
| LDPE (pph) | 100 | 100 | 100 | 100 | 100 | 100 |
| Fish Gelatin (pph) | 40 | 40 | 40 | 40 | 40 | 40 |
| Sorbitol (pph) | 18 | | | | | |
| Maleated Polyethylene (pph) | 5 | 5 | 5 | 5 | 5 | 5 |
| Stearic Acid (pph) | 4 | | 4 | 4 | 4 | 4 |
| PTFE (pph) | | 6 | 4 | | | 4 |
| Silicone oil (pph) | | | 0.5 | 0.5 | 0.5 | 0.5 |
| Boehmite Alumina (pph) | | | | 3 | 2 | |
| Mixing Temp. (° C.) | 180 | 180 | 130 | 150 | 150 | 150 |
| Molding Method (I = Injection Mold) (C = Compression Mold) | C | C | C | C | C | C |
| UL(94) Rating | HB | HB | HB | HB | HB | V(0) |

As shown in Table 2, Sample 26 was found to possess a UL(94) rating of V(0). Each of the samples included fish gelatin as the only flame retardant material, but Sample 26 was found to provide the fish gelatin in an amount of 40 pph together with other additives, and processed at a temperature of 150° C., which yielded the V(0) rating. Hence, Samples 21-26 show that when fish gelatin makes up the majority of the thermal retardant additive, the components that form the polymer composite material may be processed around 150° C. Temperatures outside this range were shown to catch fire and drip molten char. As understood, the lower processing temperature (e.g., 130° C., Sample 23) may not have allowed for sufficient dispersion of the fish gelatin into the polymer. Furthermore, the higher processing temperature (e.g., 180° C., Sample 23) may have resulted in the breakdown of the gelatin.

Figure 5:
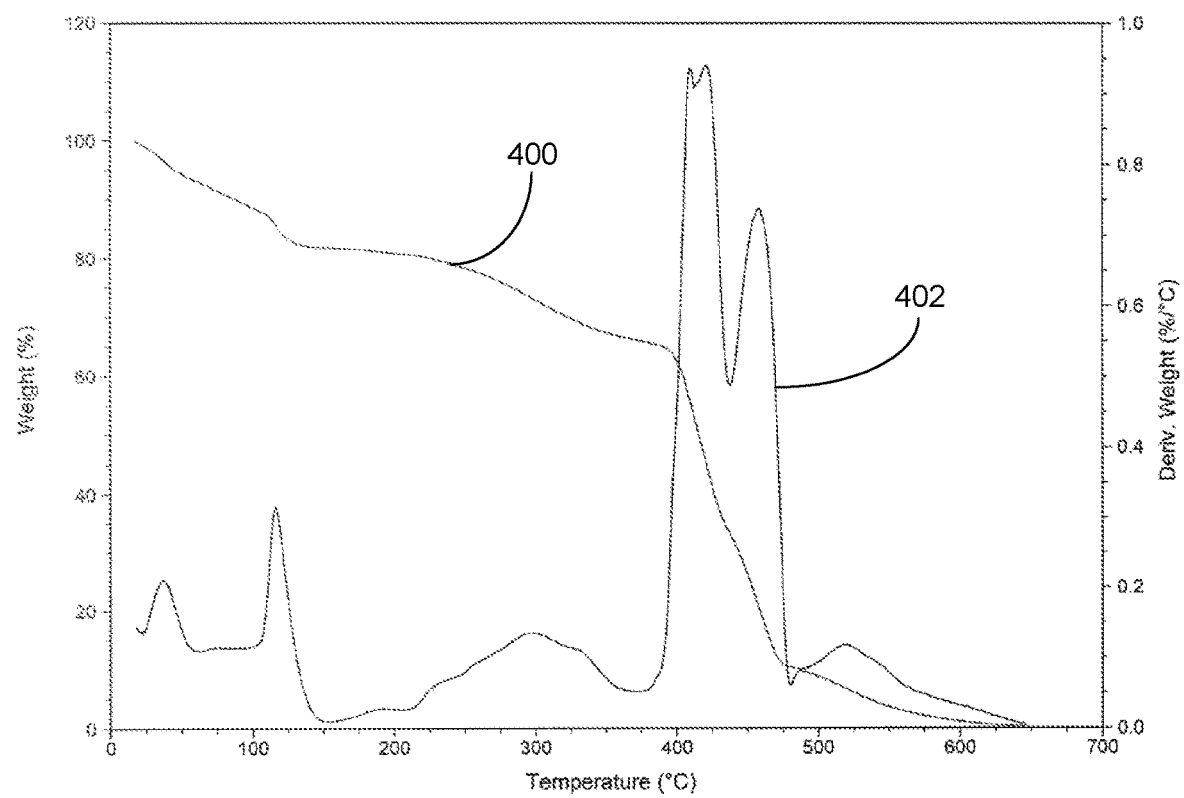
FIG. 5 is a graph showing the temperature of decomposition for a polymer composite material including LDPE and fish gelatin.

FIG. 5 is a graph showing the temperature of decomposition for the Sample 26. Curve 400 shows the change in weight of the polymer composite material as a function of increased temperature. Curve 402 shows the rate of change in the weight of the polymer composite material as a function of increased temperature. The results shown in FIG. 5 illustrates the improvement in the flame retardant property as compared with the LDPE control. In FIG. 5 (LDPE and gelatin), the initial decomposition temperature is about 400° C., which is higher than that shown in FIG. 2.

Several samples were also prepared in which the LDPE polymer was modified by including both of a tannin and a gelatin in the polymer composite material. Table 3 sets forth the compositions and results of these samples:

TABLE 3

Polymer Composite Samples including Tannin and Gelatin

| Component | 31 | 32 | 33 | 34 | 35 | 36 |
|---|---|---|---|---|---|---|
| LDPE (pph) | 100 | 100 | 100 | 100 | 100 | 100 |
| Tannic Acid (pph) | 22.5 | 20 | 36 | 22.5 | 25 | 7 |
| Fish Gelatin (pph) | 3 | 3 | 12 | 3 | 6 | 42 |
| Citric Acid (pph) | 2.5 | 2.5 | 18 | 11.25 | 2.5 | 3.5 |
| Maleated Polyethylene (pph) | 2.5 | 2.5 | 5 | 5 | 5 | 5 |
| Stearic Acid (pph) | 2 | 0.23 | 4 | 4 | | 4 |
| PTFE (pph) | | | 4 | 4 | | 4 |
| Silicone oil (pph) | | | 0.5 | 0.5 | | 0.5 |
| Sorbitol (pph) | 1.35 | 0.46 | | 1.35 | 2.7 | |
| Borax (pph) | | | | 7.5 | 9 | |
| Mixing Temp. (° C.) | 200 | 220 | 220 | 180 | 180 | 180 |
| Molding Method (I = Injection Mold) (C = Compression Mold) | C | C | C | C | C | C |
| UL(94) Rating | HB | HB | HB | HB | HB | V(0) |

As shown in Table 3, Samples 31, 32, 34, and 35 include tannic acid and fish gelatin in the polymer composite material as the only flame retardant additives, but collectively they are present at lower amounts (i.e., at 31 pph or less). When Samples 31, 32, 34, and 35 were subjected to the UL(94) test, the sample ignited and flames were observed burning upwards on the molded bar. Samples 31, 32, 34, and 35 were classified as having a HB rating. Sample 33 includes tannic acid and fish gelatin in the polymer composite material as the only flame retardant additives, and collectively they are present at 48 pph. However, the mixing in Sample 33 is conducted at a higher temperature (220° C.). When Sample 33 was subjected to the UL(94) test, the sample ignited and flames were observed burning upwards on the molded bar. Sample 33 was classified as having a HB rating. Sample 36 includes tannic acid and fish gelatin in the polymer composite material as the only flame retardant additives, and collectively they are present at 49 pph. The mixing in Sample 36 is conducted at a lower temperature (180° C.). When Sample 36 was subjected to the UL(94) test, the sample self-extinguished within 10 seconds from when the Bunsen burner was removed, and flaming materials did not drip off of the sample during the test (and as a result the cotton located below the sample was not ignited). Sample 36 was classified as having a V(0) rating.

In the examples set forth above, the samples were produced on a smaller, laboratory scale, with the samples being mixed using a bench scale mixer. Such samples were mixed at an elevated temperature and then formed into the shape of the bar for UL(94) testing. Table 4 sets forth the compositions of polymer that have been tested on a larger scale using a twin-screw extruder.

TABLE 4

Polymer Composite Samples including Tannin and Gelatin

| Component | 41 | 42 | 43 | 44 | 45 |
|---|---|---|---|---|---|
| LDPE (pph) | 100 | 100 | 100 | 100 | 100 |
| Tannic Acid (pph) | | | 7 | 7 | 7 |
| Fish Gelatin (pph) | | 50 | 42 | | |
| Citric Acid (pph) | | | 3.5 | 3.5 | 3.5 |
| Maleated Polyethylene (pph) | | 5 | 5 | 5 | 5 |
| Stearic Acid (pph) | | 4 | 4 | 4 | 4 |
| PTFE (pph) | | 4 | 4 | 4 | |
| Magnesium Hydroxide (pph) | | | | 42 | |
| Melamine Cyanurate (pph) | | | | | 42 |
| Sassol Crosslinker (pph) | | | | | 2 |
| Mixing Temp. (° C.) | 200 | 150 | 180 | 180 | 180 |
| Molding Method (I = Injection Mold) (C = Compression Mold) | I | I | I | I | I |
| UL(94) Rating | HB | V(0) | V(0) | V(0) | V(0) |
| Modulus (MPa) | 130 ± 10 | 430 ± 40 | 300 ± 50 | 270 ± 46 | 350 ± 40 |
| Yield Stress (MPa) | 14.2 ± 0.6 | 9.0 ± 0.4 | 13.0 ± 0.6 | 12.0 ± 0.4 | 12.3 ± 0.2 |

Figure 6:
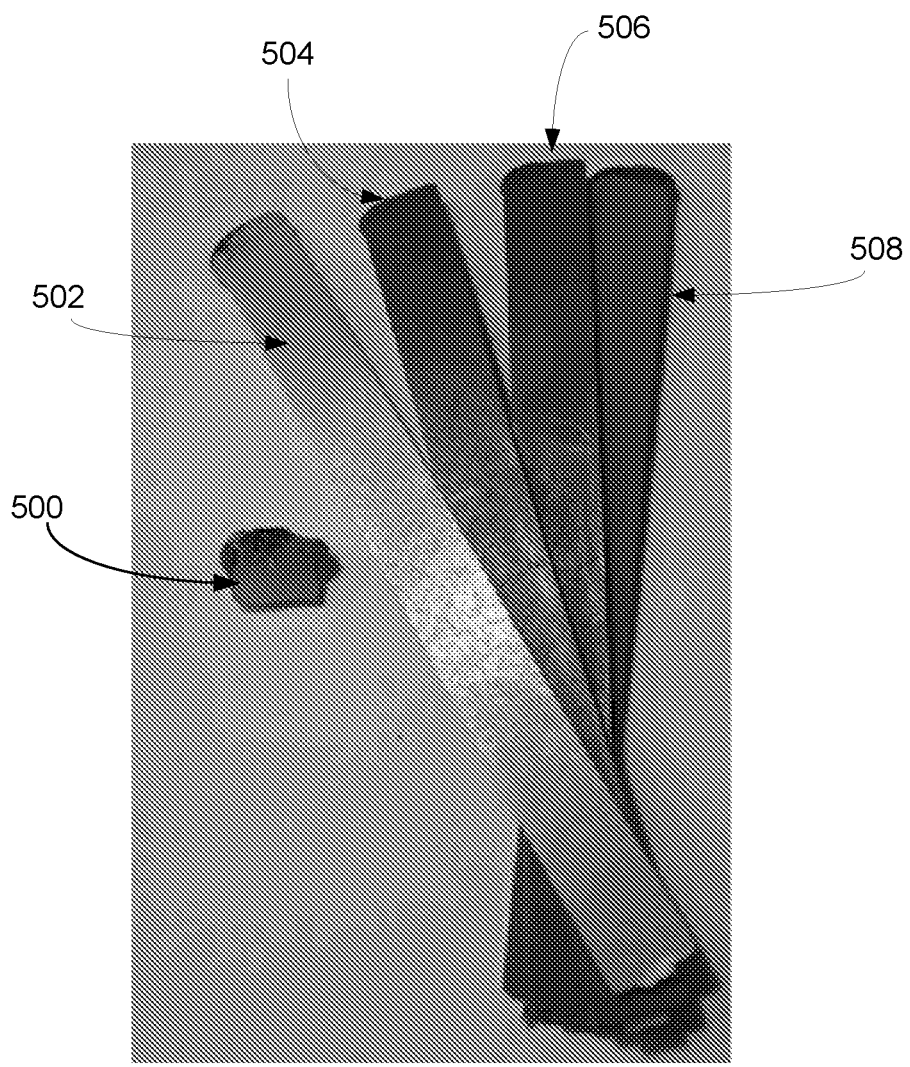
FIG. 6 is a photograph showing test pieces that have been subjected to the UL(94) vertical burn test.

When Sample 41 (control) was subjected to the UL(94) test, the sample ignited and flames were observed burning upwards on the molded bar. Sample 41 was classified as having a HB rating. When Samples 42-45 were subjected to the UL(94) test, the sample self-extinguished within 10 seconds from when the Bunsen burner was removed, and flaming materials did not drip off of the sample during the test (and as a result the cotton located below the sample was not ignited). Samples 42-45 were classified as having a V(0) rating. FIG. 6 shows the test pieces of Samples 41-45 subjected to the UL(94) test. As shown, bar 500 corresponds to Sample 41 and has been mostly burned away as a result of the flame from the Bunsen burner causing ignition of the sample. Bar 502 corresponds to Sample 42, and is lighter in appearance than bars 504, 506, 508 due to the lack of tannin material; bar 504 corresponds to Sample 43; bar 506 corresponds to Sample 44; and bar 508 corresponds to Sample 45. Each of bars 502, 504, 506, 508 are largely intact even following the UL (94) testing.

Furthermore, as shown in Table 4, the modulus is increased as compared with the control. The yield stress remains relatively the same as compared with the control.

Although the subject matter of the present disclosure has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments. In addition, while a particular feature of the present disclosure may have been described above with respect to only one or more of several illustrated embodiments, such feature may be combined with one or more other features of the other embodiments, as may be desired and advantageous for any given or particular application.

The invention claimed is:

1. A polymer composite material, comprising a blend of one or more thermoplastic polymers and one or more bio-based flame retardant additives, wherein the one or more thermoplastic polymers comprises polystyrene and the one or more bio-based flame retardant additives comprises gelatin, wherein the one or more bio-based flame retardant additives are present in an amount of 35 to 100 parts per 100 parts by weight of the one or more thermoplastic polymers, and wherein the gelatin is present from about 40 to about 100 parts per 100 parts by weight of the one or more thermoplastic polymers.

2. The polymer composite material of claim 1, wherein the one or more bio-based flame retardant additives further comprises tannic acid.

3. The polymer composite material of claim 2, further comprising one or more additional flame retardant additive other than the gelatin and tannic acid.

4. The polymer composite material of claim 1, wherein the gelatin comprises fish gelatin.

5. The polymer composite material of claim 1, wherein the one or more thermoplastic polymers further comprises polyethylene.

6. The polymer composite material of claim 1, wherein the one or more thermoplastic polymers further comprises low-density polyethylene (LDPE).

7. The polymer composite material of claim 1, wherein the one or more thermoplastic polymers further comprises polypropylene.

8. The polymer composite material of claim 1, wherein the one or more thermoplastic polymers further comprises one or more of acrylonitrile butadiene styrene (ABS) copolymer, nylon 6, nylon 6,6, polyamides, poly(butylene terephthalate), poly(ethylene terephthalate) and its copolymers, polyesters, thermoplastic polyurethanes, polyester-ether elastomers, and polyacetal.

9. The polymer composite material of claim 1, wherein the polystyrene is expanded polystyrene.

10. The polymer composite material of claim 9, wherein the polymer composite material is a foam material.

11. The polymer composite material of claim 1, further comprising one or more maleated polymers.

12. The polymer composite material of claim 1, further comprising one or more of citric acid, stearic acid, silicone oil, and dibenzylidene sorbitol.

13. The polymer composite material of claim 1, further comprising one or more of PTFE, alumina, and clay.

14. A method of forming the polymer composite material of claim 1, comprising:
   blending the one or more thermoplastic polymers and the one or more bio-based flame retardant additives together at a temperature between 140° C. and 240° C. to form the polymer composite material;
   forming an article from the polymer composite material; and
   cooling the formed article.

* * * * *